United States Patent
Saito

(10) Patent No.: US 10,198,682 B2
(45) Date of Patent: Feb. 5, 2019

(54) RECEIVING SYSTEM AND MEMORY CARD

(71) Applicant: Toshiba Memory Corporation, Minato-ku (JP)

(72) Inventor: Toshitada Saito, Yokohama (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 83 days.

(21) Appl. No.: 15/432,364

(22) Filed: Feb. 14, 2017

(65) Prior Publication Data

US 2018/0075334 A1    Mar. 15, 2018

Related U.S. Application Data

(60) Provisional application No. 62/394,019, filed on Sep. 13, 2016.

(51) Int. Cl.
*G06K 19/073* (2006.01)
*G06K 19/077* (2006.01)

(52) U.S. Cl.
CPC . *G06K 19/07345* (2013.01); *G06K 19/07732* (2013.01)

(58) Field of Classification Search
CPC ............... G06K 19/07345; G06K 19/07732
See application file for complete search history.

(56) References Cited

U.S. PATENT DOCUMENTS

| | | | |
|---|---|---|---|
| 5,565,812 A | 10/1996 | Soenen | |
| 6,101,322 A * | 8/2000 | Goodrum | G06F 13/4081 710/302 |
| 7,643,575 B2 | 1/2010 | Lewis et al. | |
| 8,958,575 B2 | 2/2015 | Chilakapati et al. | |
| 2012/0133459 A1* | 5/2012 | Zhuang | H04B 3/14 333/28 R |
| 2015/0214935 A1 | 7/2015 | Terauchi et al. | |
| 2016/0247057 A1* | 8/2016 | Lee | G06K 19/0727 |
| 2018/0107849 A1* | 4/2018 | Park | G06T 7/70 |

FOREIGN PATENT DOCUMENTS

| | | |
|---|---|---|
| JP | 4382125 | 12/2009 |
| JP | 5108097 | 12/2012 |

* cited by examiner

*Primary Examiner* — Thien M Le
*Assistant Examiner* — Asifa Habib
(74) *Attorney, Agent, or Firm* — Oblon, McClelland, Maier & Neustadt, L.L.P.

(57) ABSTRACT

According to one embodiment, a receiving system includes a first receiving circuit and a second receiving circuit each receiving a differential signal with a positive phase signal and a negative phase signal, and a controller controlling the first and second receiving circuits. The first receiving circuit comprises a first differential amplifier outputting a first signal in a first time frame in which a polarity of the differential signal does not change dependent on a passage of time. The second receiving circuit comprises a second differential amplifier outputting a second signal in a second time frame in which the polarity of the differential signal changes dependent on the passage of time.

20 Claims, 12 Drawing Sheets

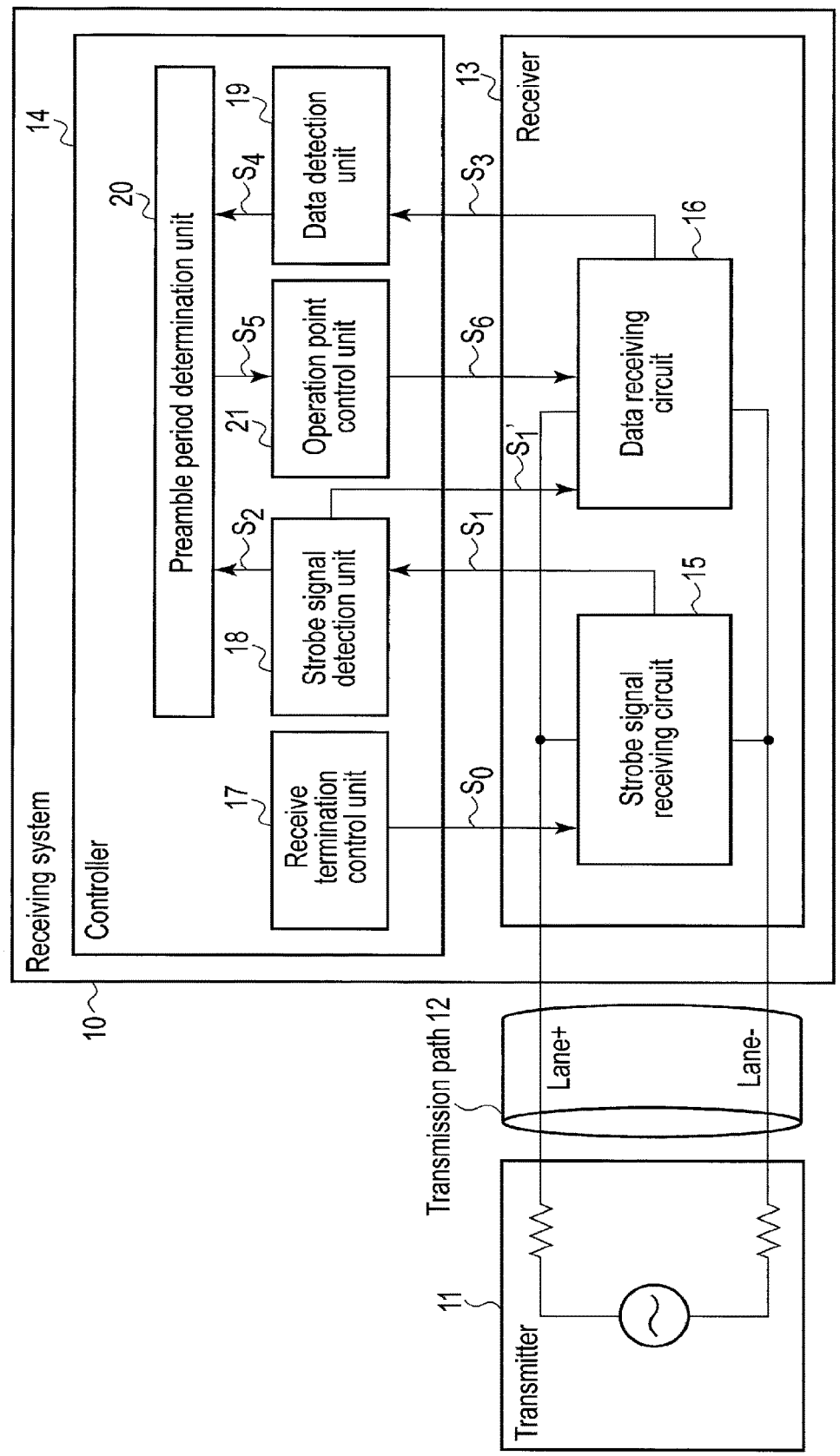
F I G. 1

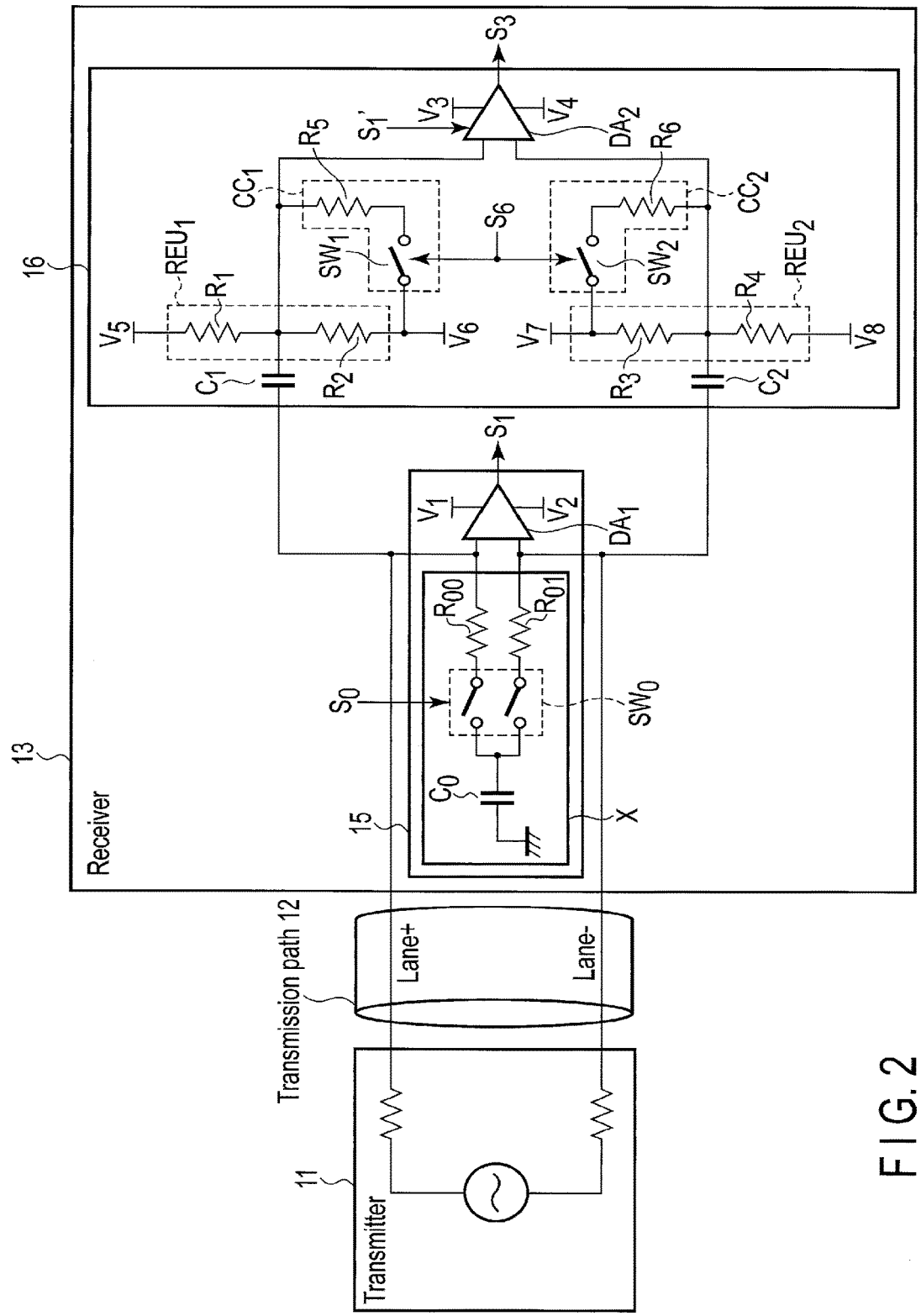
F I G. 2

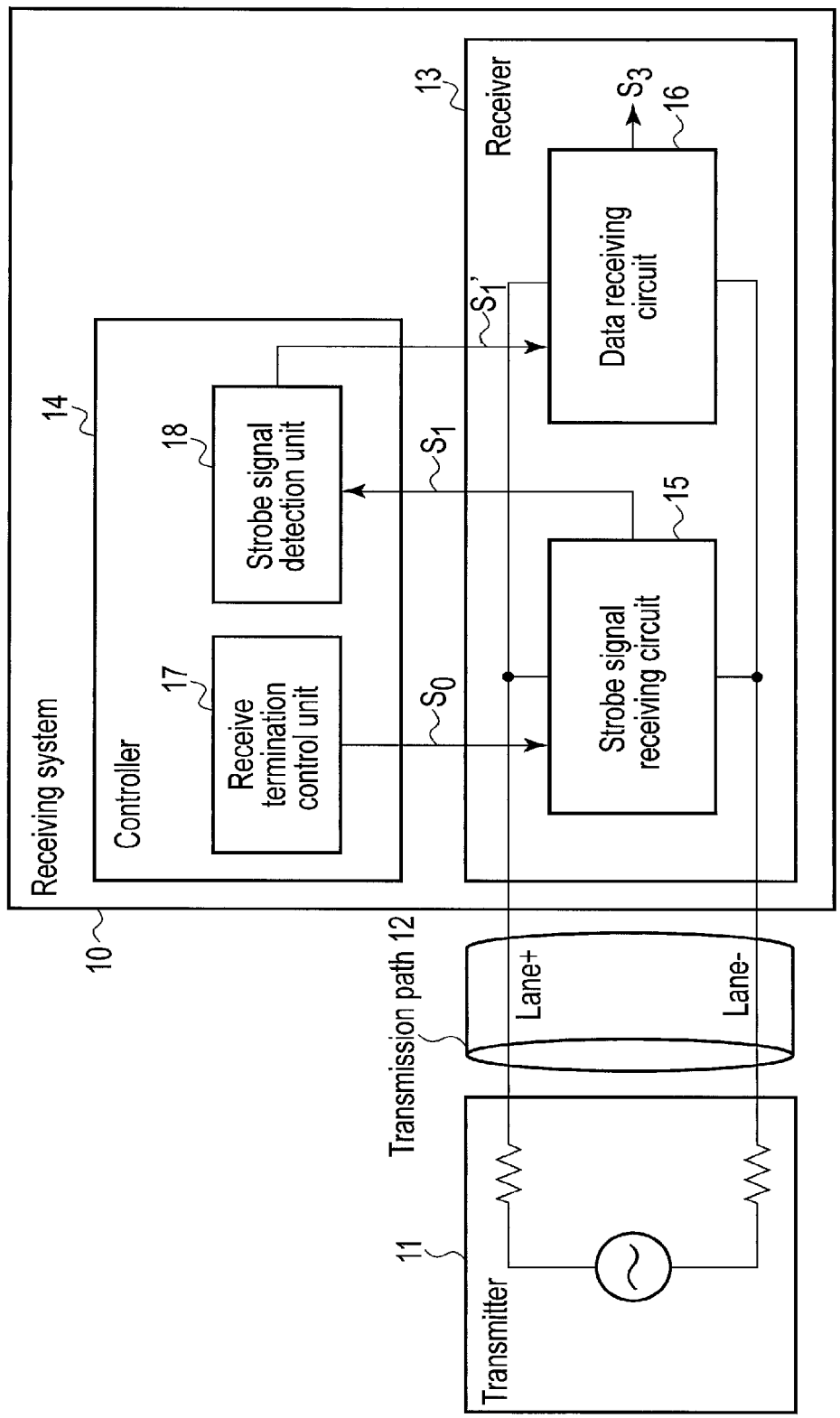
F I G. 5

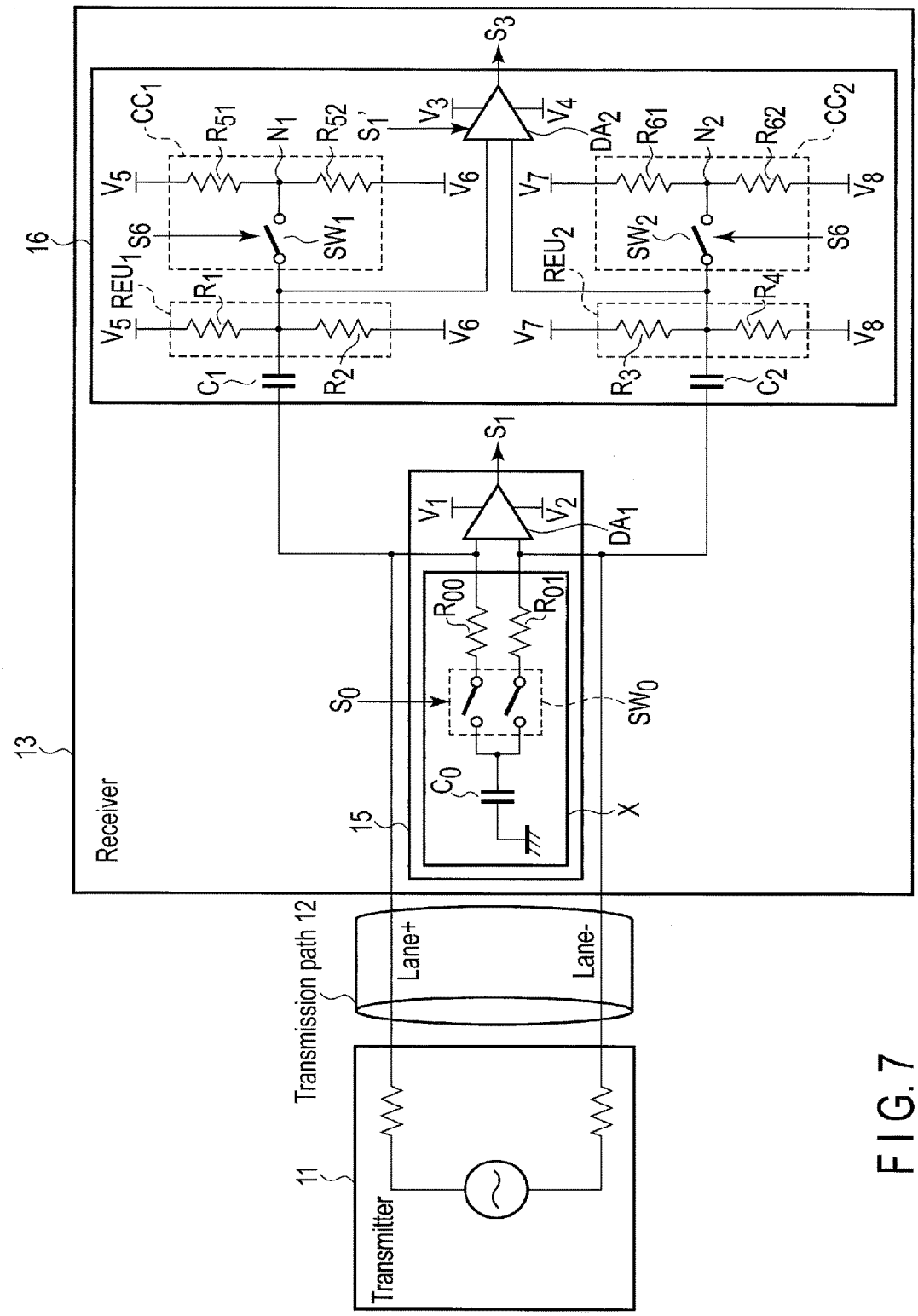
F I G. 7

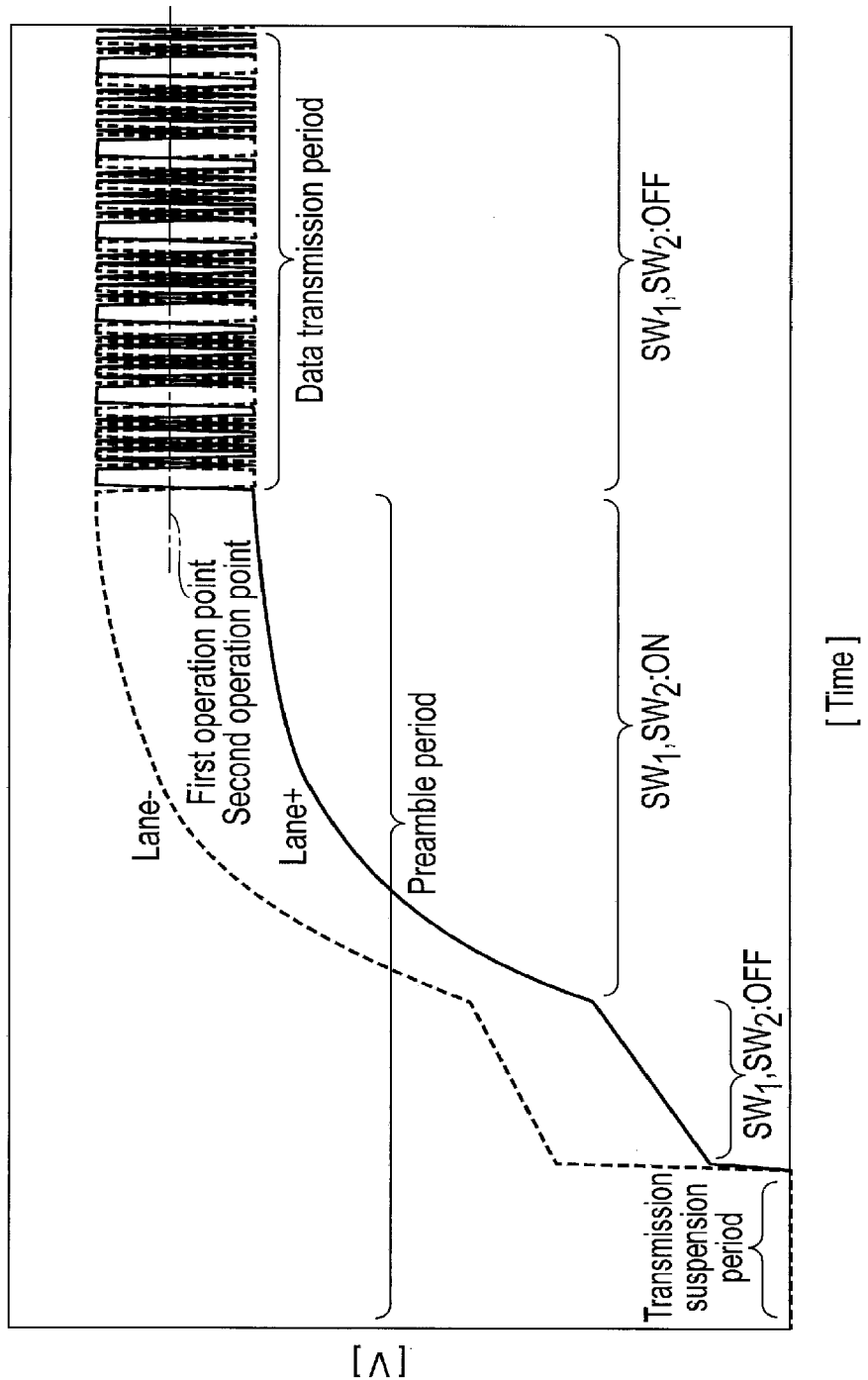
F I G. 8

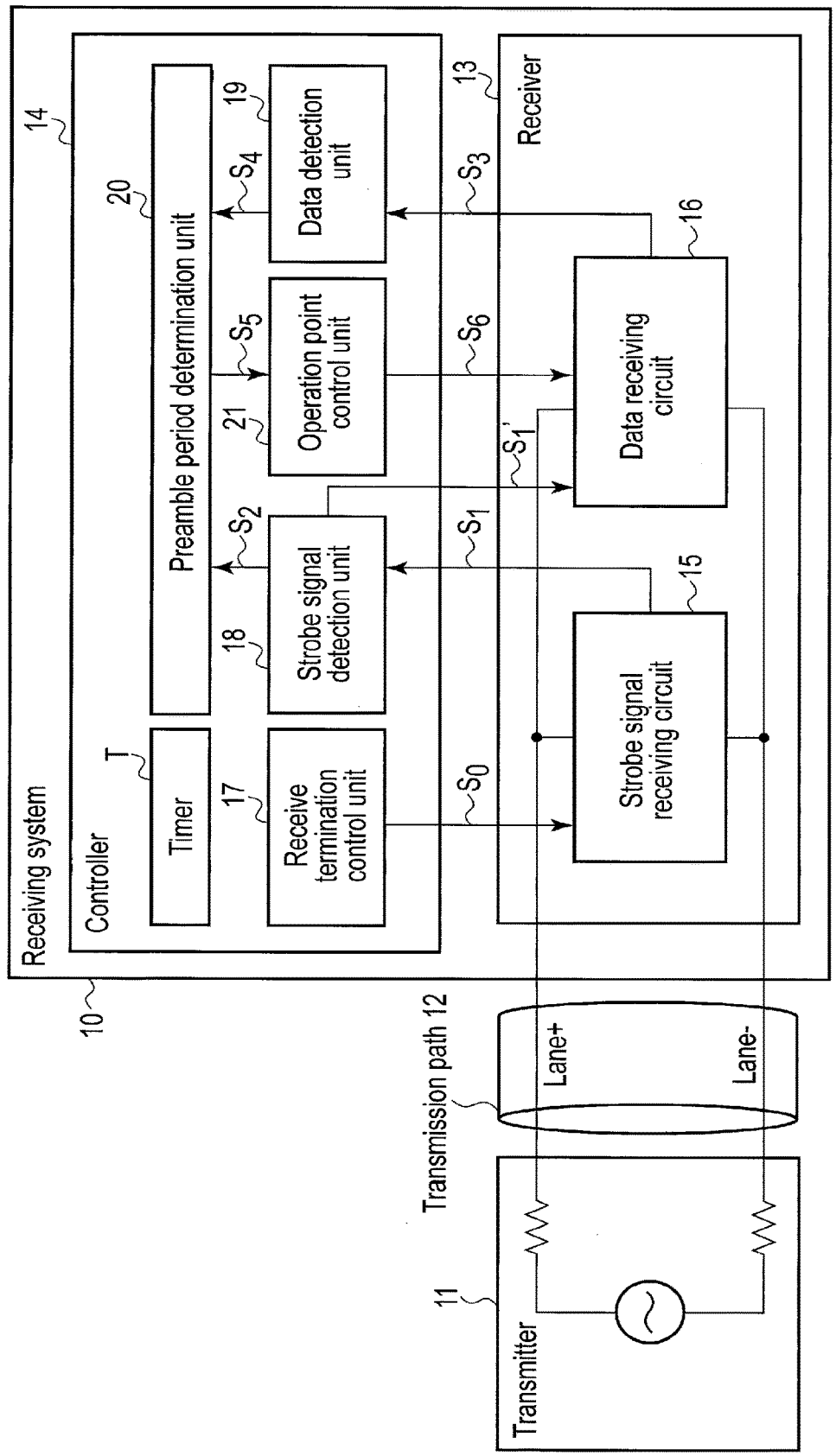
F I G. 9

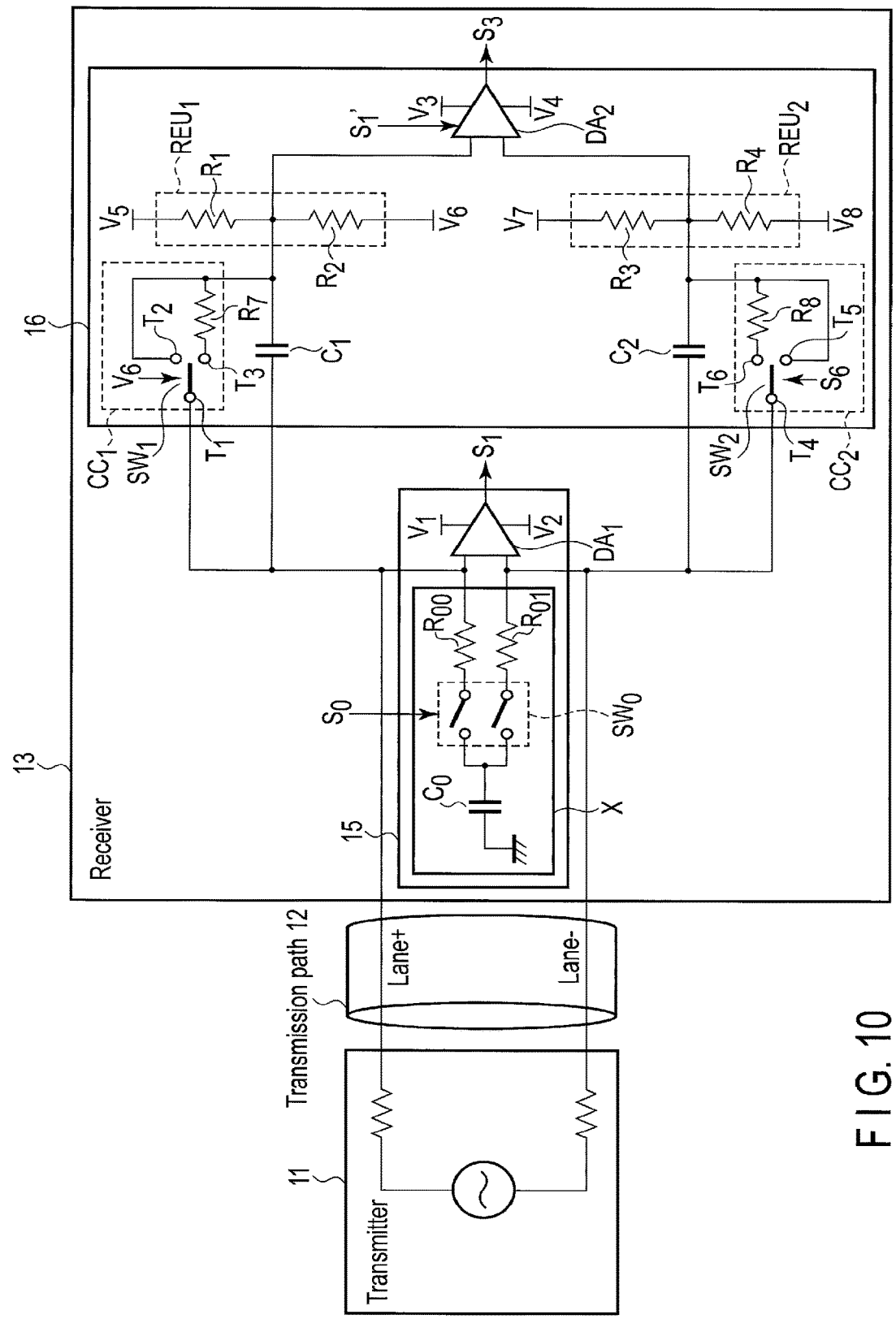
F I G. 10

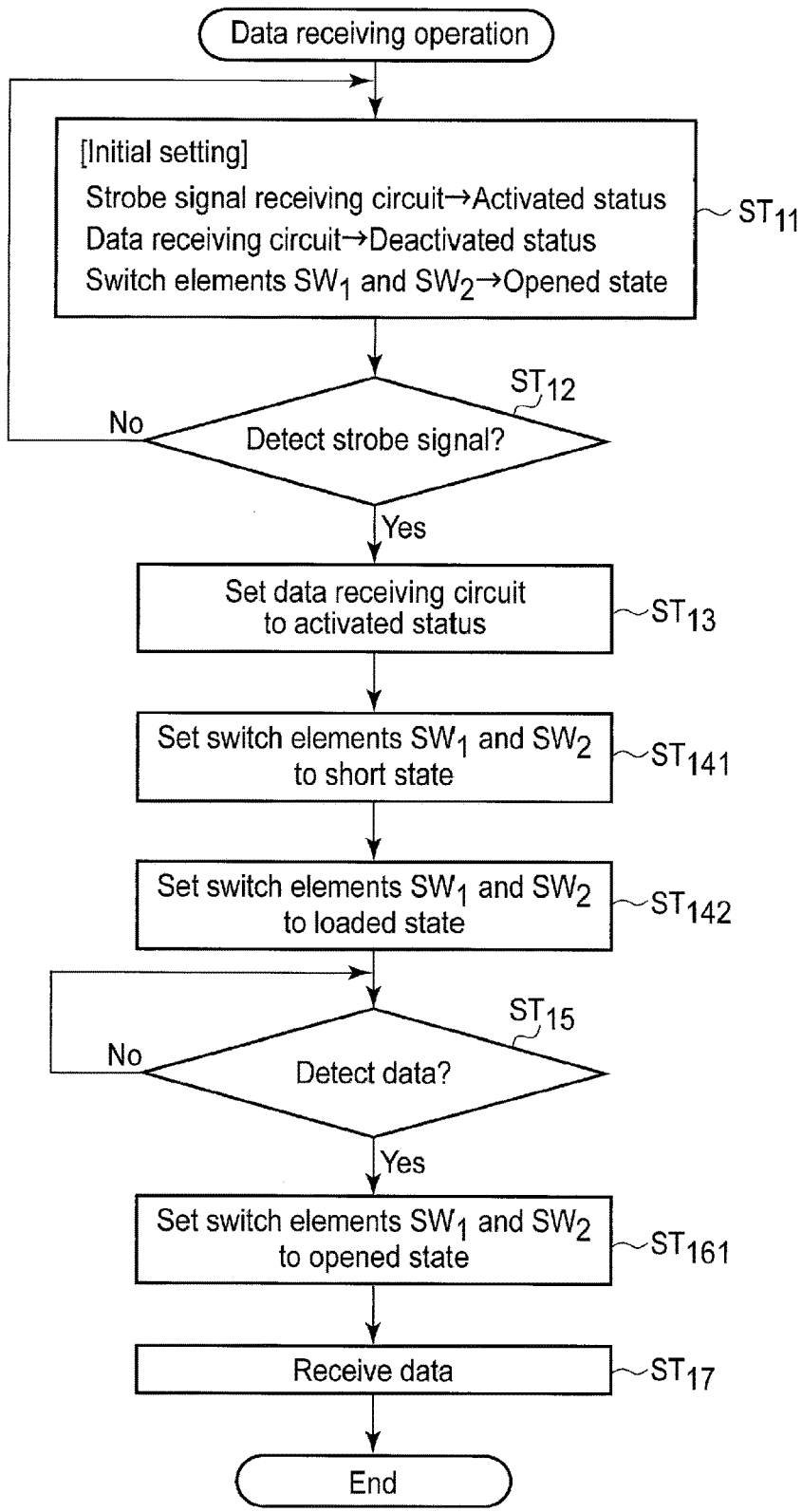
F I G. 11

RECEIVING SYSTEM AND MEMORY CARD

CROSS-REFERENCE TO RELATED APPLICATIONS

This application claims the benefit of U.S. Provisional Application No. 62/394,019, filed Sep. 13, 2016, the entire contents of which are incorporated herein by reference.

FIELD

Embodiments described herein relate generally to a receiving system and a memory card.

BACKGROUND

In general, AC coupling capable of improving receiver's performance is employed in a high-speed serial transmission system of Universal Serial Bus (USB), peripheral component interconnect express (PCIe) and the like. Recently, a DC level signal conforming to Ultra High Speed-II (UHS-II) protocol or the like has been often used as a handshake signal transmitted between a transmitter and a receiver.

BRIEF DESCRIPTION OF THE DRAWINGS

FIG. 1 is a block diagram showing a receiving system of a first embodiment.

FIG. 2 is a block diagram showing a receiver of the first embodiment.

FIG. 5 is a block diagram showing a receiving system of a comparative embodiment.

FIG. 7 is a block diagram showing a receiver of a second embodiment.

FIG. 8 is an illustration showing a signal waveform of a received signal (differential signal) of the second embodiment.

FIG. 9 is a block diagram showing a receiving system of a third embodiment.

FIG. 10 is a block diagram showing a receiver of a third embodiment.

FIG. 11 is a flowchart showing an example of a data receiving operation.

DETAILED DESCRIPTION

Figure 3:
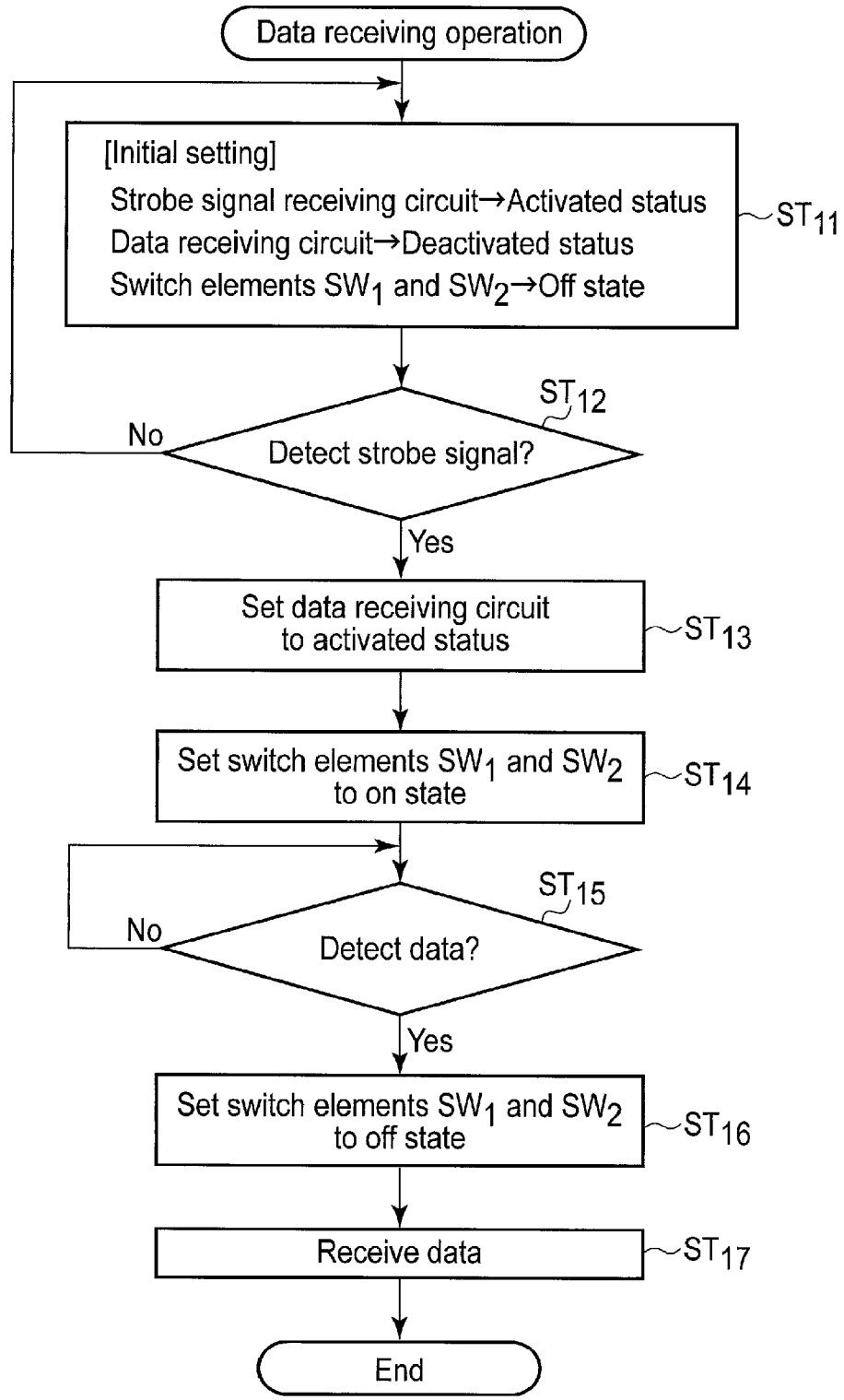
FIG. 3 is a flowchart showing an example of a data receiving operation.

In general, according to one embodiment, a receiving system comprising: a first receiving circuit and a second receiving circuit each receiving a differential signal with a positive phase signal and a negative phase signal; and a controller controlling the first and second receiving circuits. The first receiving circuit comprises a first differential amplifier outputting a first signal in a first time frame in which a polarity of the differential signal does not change dependent on a passage of time. The second receiving circuit comprises a second differential amplifier having a first input terminal and a second input terminal and outputting a second signal in a second time frame in which the polarity of the differential signal changes dependent on the passage of time, a first capacitor having a first electrode inputted the positive phase signal and a second electrode connected to the first input terminal, a first resistance unit determining a first operation point of the positive phase signal in the second differential amplifier, a second capacitor having a third electrode inputted the negative phase signal and a fourth electrode connected to the second input terminal, a second resistance unit determining a second operation point of the negative phase signal in the second differential amplifier, and a correction circuit correcting a deviation between the first and second operation points. The controller activates the second differential amplifier and the correction circuit on the basis of the first signal, and deactivates the correction circuit on the basis of the second signal.

First Embodiment

FIG. 1 is a block diagram showing a receiving system of a first embodiment.

A receiving system 10 receives a differential signal transmitted from a transmitter 11 via a transmission path (Lane$^+$ and Lane$^-$) 12.

The receiving system 10 comprises a receiver 13 and a controller 14. The receiver 13 comprises a strobe signal receiving circuit (first receiving circuit) 15 and a data receiving circuit (second receiving circuit) 16.

The strobe signal receiving circuit 15 receives a strobe signal as a handshake signal between the transmitter 11 and the receiver 13. The strobe signal is a DC-level signal, indicating that, for example, when a low-level voltage is applied to Lane+ and a high-level voltage is applied to Lane$^-$, data is then transmitted from the transmitter 11. The DC-level signal indicates a signal in which a polarity of a differential signal is not varied in accordance with a passage of time.

The data receiving circuit 16 receives data. The data (AC-level signal) indicates a signal in which a polarity of a differential signal is varied in accordance with the passage of time.

The controller 14 comprises a receive termination control unit 17, a strobe signal detection unit 18, a data detection unit 19, a preamble period determination unit 20, and an operation point control unit 21. These units may be hardware, software or their combination.

The receive termination control unit 17 outputs a control signal $S_0$ to activate the strobe signal receiving circuit 15, in a data receiving operation. When the strobe signal receiving circuit 15 receives the control signal $S_0$, the strobe signal receiving circuit 15 becomes capable of receiving the strobe signal. When the strobe signal receiving circuit 15 receives the strobe signal, the strobe signal receiving circuit 15 outputs an output signal $S_1$.

The strobe signal detection unit 18 detects the strobe signal, based on the output signal $S_1$ of the strobe signal receiving circuit 15. When the strobe signal detection unit 18 detects the strobe signal, the strobe signal detection unit 18 outputs output signals $S_1'$ and $S_2$.

The output signal $S_1'$ is output to the data receiving circuit 16, and the output signal $S_2$ is output to the preamble period determination unit 20.

When the data receiving circuit 16 receives the output signal $S_1'$, the data receiving circuit 16 becomes capable of receiving the data. In other words, the data receiving circuit 16 is deactivated until receiving the output signal $S_1'$. Thus, reduction in power consumption of the receiving system 10 is attempted by first activating the strobe signal receiving circuit 15, receiving the strobe signal and then activating the data receiving circuit 16, in the data receiving operation.

When the data receiving circuit 16 receives the data, the data receiving circuit 16 outputs an output signal $S_3$. The data detection unit 19 detects the data, based on the output signal $S_3$ of the data receiving circuit 16. When the data detection unit 19 receives the data, the data detection unit 19 outputs an output signal $S_4$ to the preamble period determination unit 20.

The preamble period determination unit 20 determines a preamble period as a preamble of data transfer, based on the output signals $S_2$ and $S_4$.

The operation point control unit 21 controls operation points of differential signals in the data receiving circuit 16, i.e., an operation point of a positive phase signal and an operation point of a negative phase signal, during the preamble period. That is, the operation point control unit 21 outputs a control signal $S_6$ to the data receiving circuit 16, based on a control signal $S_5$ from the preamble period determination unit 20. The data receiving circuit 16 corrects deviations of the operation point of the positive phase signal and the operation point of the negative phase signal, based on the control signal $S_6$, during the preamble period. This operation will be described below.

The operation point of the positive phase signal indicates a middle point (middle voltage) between a high-level voltage and a low-level voltage of the positive phase signal. The operation point of the negative phase signal indicates a middle point (middle voltage) between a high-level voltage and a low-level voltage of the negative phase signal.

FIG. 2 shows a receiver of the first embodiment.

The receiver 13 comprises the strobe signal receiving circuit 15 and the data receiving circuit 16.

The strobe signal receiving circuit 15 comprises a differential amplifier $DA_1$ and a receive termination circuit X. The receive termination circuit X comprises a capacitor $C_0$, a switch element $SW_0$, and resistance elements $R_{00}$ and $R_{01}$. The switch element $SW_0$ is turned on by a control signal $S_0$. When the switch element $SW_0$ is on, the strobe signal receiving circuit 15 is activated and the receiver 13 becomes capable of receiving a signal.

The differential amplifier $DA_1$ is driven by power supply voltages $V_1$ and $V_2$. A drive power of the differential amplifier $DA_1$ is smaller than a drive power of a differential amplifier $DA_2$ which will be explained below. When the differential amplifier $DA_1$ receives the strobe signal in the preamble period in which polarities of the differential signals (Lane$^+$ and Lane$^-$) are not changed in accordance with the passage of time, the differential amplifier $DA_1$ outputs the output signal $S_1$.

The data receiving circuit 16 comprises a differential amplifier $DA_2$, resistance units $REU_1$ and $REU_2$, capacitors (coupling capacitors) $C_1$ and $C_2$, and correction circuits $CC_1$ and $CC_2$. The differential amplifier $DA_2$ comprises a first input terminal and a second input terminal, and outputs the output signal $S_3$ in a data transmission period in which the polarities of the differential signals are changed in accordance with the passage of time. The first input terminal is for example a positive input terminal, and the second input terminal is for example a negative input terminal.

The differential amplifier $DA_2$ is driven by power supply voltages $V_3$ and $V_4$. A drive power of the differential amplifier $DA_2$ is larger than the drive power of the differential amplifier $DA_1$ to realize high-speed data reception. However, since the power consumption of the receiving system becomes large when the differential amplifier $DA_2$ is activated from a beginning of the data receiving operation, the differential amplifier $DA_2$ is activated after the strobe signal is detected as explained above.

The capacitor $C_1$ comprises a first electrode to which the positive phase signal (Lane$^+$) is input, and a second electrode connected to the first input terminal of the differential amplifier $DA_2$. The resistance unit $REU_1$ determines a first operation point of the positive phase signal (Lane$^+$) in the differential amplifier $DA_2$.

For example, the resistance unit $REU_1$ comprises a resistance element $R_1$ connected between a power supply terminal $V_5$ and the first input terminal of the differential amplifier $DA_2$, and a resistance element $R_2$ connected between a power supply terminal $V6$ and the first input terminal of the differential amplifier $DA_2$. In this case, the first operation point is determined by a resistance ratio between the resistance elements $R_1$ and $R_2$.

The capacitor $C_2$ comprises a third electrode to which a negative phase signal (Lane$^-$) is input, and a fourth electrode connected to the second input terminal of the differential amplifier $DA_2$. The resistance unit $REU_2$ determines a second operation point of the negative phase signal (Lane$^-$) in the differential amplifier $DA_2$.

For example, the resistance unit $REU_2$ comprises a resistance element $R_3$ connected between a power supply terminal $V_7$ and the second input terminal of the differential amplifier $DA_2$, and a resistance element $R_4$ connected between a power supply terminal $V_8$ and the second input terminal of the differential amplifier $DA_2$. In this case, the second operation point is determined by a resistance ratio between the resistance elements $R_3$ and $R_4$.

The correction circuit $CC_1$ comprises a resistance element $R_5$ and a switch element $SW_1$ connected in series between a power supply terminal $V_6$ and the first input terminal of the differential amplifier $DA_2$. The correction circuit $CC_2$ comprises a resistance element $R_6$ and a switch element $SW_2$ connected in series between a power supply terminal $V_7$ and the second input terminal of the differential amplifier $DA_2$. The correction circuits $CC_1$ and $CC_2$ are activated by setting the switch elements $SW_1$ and $SW_2$ to be turned on.

In other words, the control signal $S_6$ makes the switch elements $SW_1$ and $SW_2$ to be turned on in the preamble period. The correction circuits $CC_1$ and $CC_2$ are thereby activated to correct the deviations of the first and second operation points resulting from charging and discharging of the capacitors $C_1$ and $C_2$ in the preamble period. In addition, the control signal $S_6$ makes the switch elements $SW_1$ and $SW_2$ to be turned off in the data transmission period. The data reception can be thereby started in a status in which the first operation point of the positive phase signal and the second operation point of the negative phase signal are not deviated.

Under UHS-II protocol, for example, when the data transmission is suspended, the differential signals (Lane$^+$ and Lane$^-$) are set to be an opened state (high-impedance) or set at a ground voltage. When the data transmission is started, the controller 14 of FIG. 1 activates the receiver 13 by the control signal $S_0$. After that, the strobe signal is transmitted from the transmitter 11 to the receiver 13. The strobe signal is a DC-level signal as described above and, for example, the positive phase signal (Lane$^+$) is set at a low-level voltage and the negative phase signal (Lane$^-$) is set at a high-level voltage.

Under UHS-II protocol, the data is transmitted from the transmitter 11 to the receiver 13 after the strobe signal is transmitted from the transmitter 11 to the receiver 13. The period in which the strobe signal is transmitted is called a preamble period since the period is a preamble of the data transmission.

However, if the strobe signal (DC-level signal) is received by the AC coupling receiver 13, i.e., the receiver 13 comprising the capacitors $C_1$ and $C_2$, as shown in FIG. 1 and FIG. 2, the voltages of the first and second input terminals of the differential amplifier $DA_2$ are influenced by the capacitors $C_1$ and $C_2$ and varied. This is because charging and discharging of the capacitors $C_1$ and $C_2$ occur by the strobe signal (DC-level signal).

Although the AC coupling system is employed for the purpose of appropriately designing the first and second operation points in the receiving system shown in FIG. 1 and FIG. 2, deviations of the first and second operation points occur immediately before the data reception to receive the strobe, and the precise data reception cannot be performed.

Thus, for example, if UHS-II protocol is employed in the AC coupling receiving system of the present embodiment, the controller 14 in FIG. 1 corrects the deviations of the first and second operation points by using the correction circuits $CC_1$ and $CC_2$ in FIG. 2, in the preamble period.

In FIG. 2, it is preferable that resistance values of the resistance elements $R_1$ and $R_3$ are substantially equal to each other and resistance values of the resistance elements $R_2$ and $R_4$ are substantially equal to each other. Also, it is preferable that power supply voltages of the power supply terminal $V_5$ and $V_7$ are substantially equal to each other and power supply voltages of the power supply terminal $V_6$ and $V_8$ are substantially equal to each other.

FIG. 3 shows an example of data receiving operation.

The data receiving operation is controlled by the controller 14 in FIG. 1. In the following descriptions, reference numerals attached to the respective constituent elements correspond to the reference numerals shown in FIG. 1 and FIG. 2.

First, when the data receiving operation is performed, the controller 14 activates the strobe signal receiving circuit 15, deactivates the data receiving circuit 16, and sets the switch elements $SW_1$ and $SW_2$ to the off state, as initial setting (step $ST_{11}$).

Next, when the controller 14 detects the strobe signal, the controller 14 activates the data receiving circuit (steps $ST_{12}$ to $ST_{13}$). In addition, the controller 14 sets the switches $SW_1$ and $SW_2$ to the on state (step $ST_{14}$). The timing of setting the switches $SW_1$ and $SW_2$ to the on state may be the same as or different from the timing of activating the data receiving circuit.

Next, when the controller 14 detects the data, the controller 14 sets the switches $SW_1$ and $SW_2$ to the off state (steps $ST_{15}$ to $ST_{16}$) and starts receiving, for example, packet data by using the data receiving circuit 16 (step $ST_{17}$).

According to the above-described operations, for example, the strobe signal (DC-level signal) supplied during the preamble period under the UHS-II protocol can be detected correctly while setting the first and second operation points within the optimum range of the receiving voltage of the high-speed receiving amplifier. Therefore, for example, packet data can also be received precisely.

Figure 4:
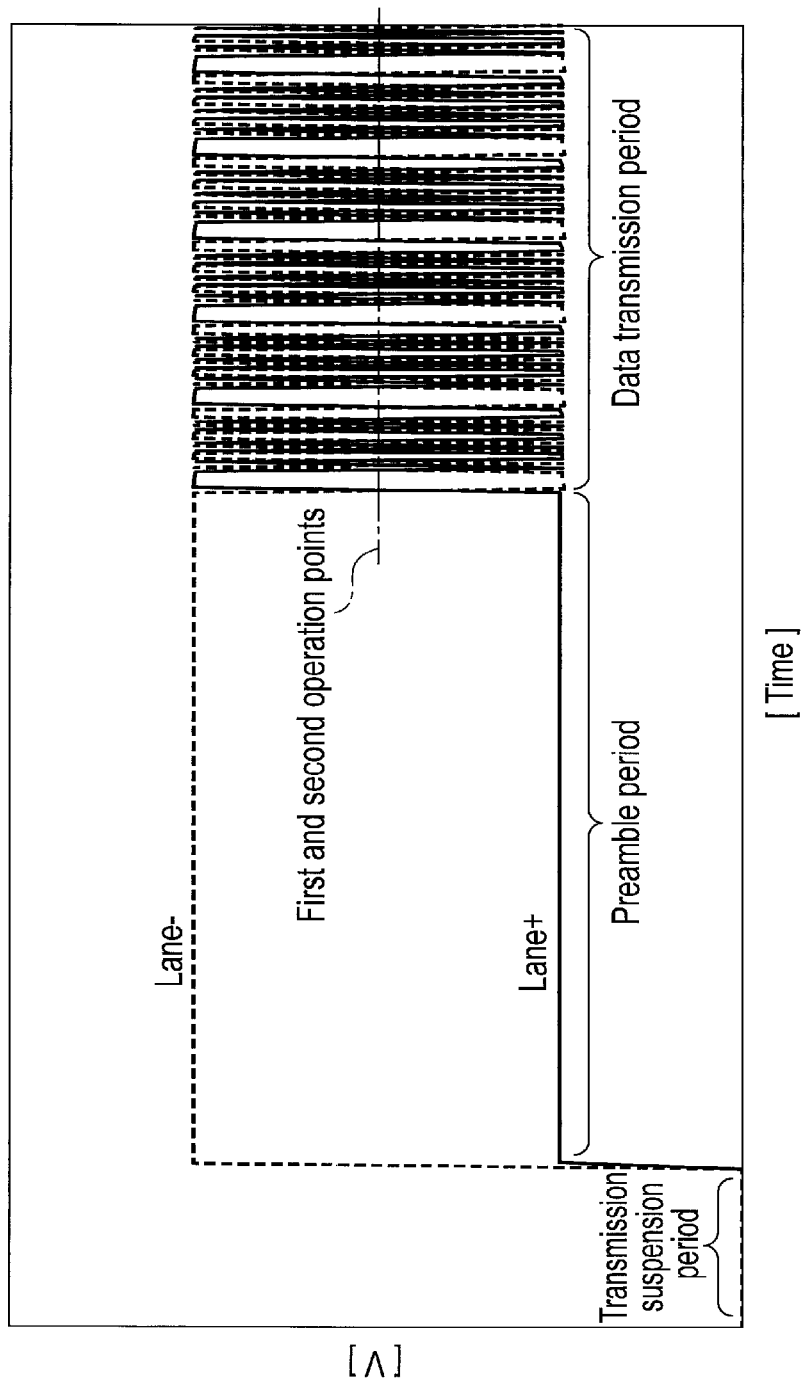
FIG. 4 is an illustration showing a signal waveform of a received signal (differential signal) of the first embodiment.

FIG. 4 shows signal waveforms of the receiving signals (differential signals).

The signal waveforms are signal waveforms obtained when the present embodiment is employed.

As clarified from the drawing, the first operation point of the positive phase signal (Lane$^+$) in the differential amplifier $DA_2$ in FIG. 2 and the second operation point of the negative phase signal (Lane$^-$) in the differential amplifier $DA_2$ in FIG. 2 substantially match in the preamble period and the data transmission period.

For example, the first operation point of the positive phase signal (Lane$^+$) is deviated to a voltage higher than a voltage determined based on the resistance ratio between the resistance elements $R_1$ and $R_2$ in the resistance unit $REU_1$, by charging and discharging of the capacitor $C_1$ shown in FIG. 2. However, since the resistance element $R_5$ in the correction circuit $CC_1$ acts in a direction of correcting the deviation, i.e., a direction of lowering the first operation point in the preamble period, the deviation of the first operation point is corrected.

Similarly to this, the second operation point of the negative phase signal (Lane$^-$) is deviated to a voltage lower than a voltage determined based on the resistance ratio between the resistance elements $R_3$ and $R_4$ in the resistance unit $REU_2$, by charging and discharging of the capacitor $C_2$ shown in FIG. 2. However, since the resistance element $R_6$ in the correction circuit $CC_2$ acts in a direction of correcting the deviation, i.e., a direction of raising the second operation point in the preamble period, the deviation of the second operation point is corrected.

Therefore, the first operation point of the positive phase signal (Lane$^+$) in the differential amplifier $DA_2$ in FIG. 2 and the second operation point of the negative phase signal (Lane$^-$) in the differential amplifier $DA_2$ in FIG. 2 substantially match in the preamble period. In addition, since the data (AC-level signal) is transmitted in the data transmission period, the correction circuits $CC_1$ and $CC_2$ are deactivated.

As a result, the first operation point of the positive phase signal (Lane$^+$) in the differential amplifier $DA_2$ in FIG. 2 and the second operation point of the negative phase signal (Lane$^-$) in the differential amplifier $DA_2$ in FIG. 2 substantially match each other, and substantially match the operation point of the differential amplifier $DA_2$, in the data transmission period, too.

The data receiving operation can be therefore performed precisely. For example, since the data can be received precisely from a leading part, the data can be acquired in a short time. In addition, since the overhead time which has been spent at the leading part of the data can be reduced, the data transfer can be performed at a high efficiency.

Figure 6:
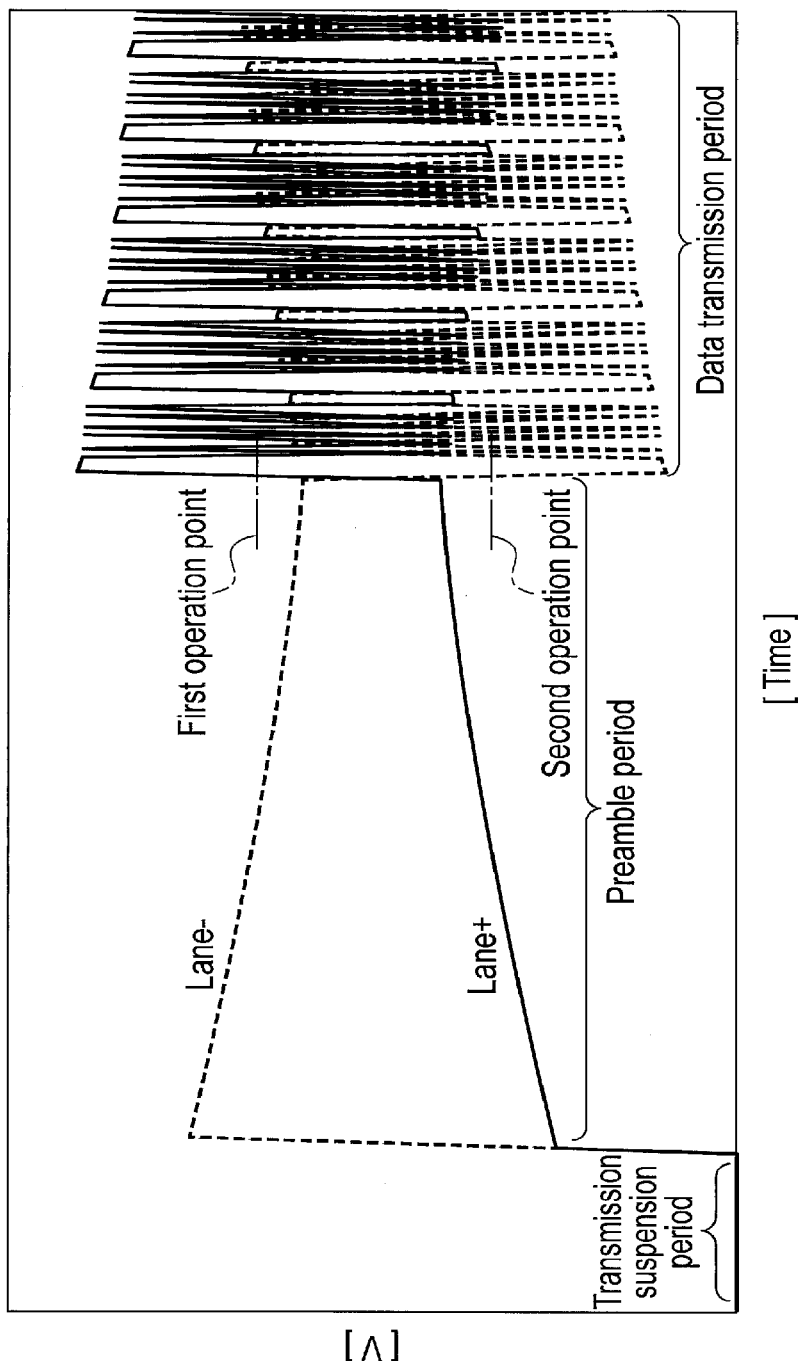
FIG. 6 is an illustration showing a signal waveform of a received signal (differential signal) of the comparative embodiment.

FIG. 5 and FIG. 6 show a comparative example.

FIG. 5 corresponds to FIG. 1, and FIG. 6 corresponds to FIG. 4.

The comparative example is an example in which the data receiving circuit 16 does not comprise the correction circuits, which are the features of the present embodiment. In the comparative example, the controller 14 does not comprise the data detection unit, the preamble period determination unit or the operation point control unit since the data receiving circuit 16 does not comprise the correction circuits.

In this case, in the preamble period, for example, the first operation point of the positive phase signal (Lane$^+$) gradually rises in proportion to storage of electric charges in the coupling capacitors, and the second operation point of the negative phase signal (Lane$^-$) gradually lowers in proportion to storage of electric charges in the coupling capacitors. Thus, the deviation between the first and second operation points occurs at the start of the data transmission period, and the packet data can hardly be received precisely due to the deviation.

According to the first embodiment, as described above, UHS-II protocol can be employed in the AC coupling receiver, by eliminating the influence from the voltage stored in the coupling capacitors in the preamble period. In addition, for example, since the DC balance is kept constantly at any time for transmission of 8b/10b-converted packet data, precise data transfer can be realized.

Second Embodiment

FIG. 7 shows a receiving system of a second embodiment.

The second embodiment is a modified example of the first embodiment.

Since the differential amplifier DA1 aims to detect the strobe signal, the differential amplifier DA1 may be a low-power amplifier driven by power supply voltages $V_1$ and $V_2$ as explained in the first embodiment. In contrast, since the differential amplifier $DA_2$ aims to realize the high-speed data reception, the differential amplifier $DA_2$ needs to be a large-power amplifier driven by power supply voltages $V_3$ and $V_4$.

In general, an operation point of the differential amplifier $DA_1$ matches first and second operation points of differential signals (a positive phase signal Lane⁺ and a negative phase signal Lane⁻) applied from a transmitter 11 to a transmission path 12, but an operation point of the differential amplifier $DA_2$ does not match first and second operation points of differential signals (a positive phase signal Lane⁺ and a negative phase signal Lane⁻). According to circuit design, in general, the operation point of the differential amplifier $DA_1$ is a substantially intermediate point (intermediate voltage) between power supply voltages $V_1$ and $V_2$, and the operation point of the differential amplifier $DA_2$ is a substantially intermediate point (intermediate voltage) between power supply voltages $V_3$ and $V_4$.

It is assumed that, for example, the differential signals (positive phase signal Lane⁺ and negative phase signal Lane⁻) applied from the transmitter 11 to the transmission path 12 has a high-level voltage of 300 mV and a low-level voltage of 100 mV and the first and second operation points are 200 mV.

In this case, if the differential amplifier $DA_2$ has the power supply voltage $V_3$ of 1.8V and the power supply voltage $V_4$ of 0V, the operation point is approximately 800 mV. Therefore, to realize high-speed data reception, in the differential amplifier $DA_2$, the first and second operation points of the differential signals (positive phase signal Lane⁺ and negative phase signal Lane⁻) in the differential amplifier $DA_2$ is desirably made to match the operation point of the differential amplifier $DA_2$ before the data receiving operation. In other words, the first and second operation points of the differential signals need to be changed from, for example, 200 mV to 800 mV by using resistance units $REU_1$ and $REU_2$.

The above-described case is assumed in the present embodiment.

Summary of a receiving system 10 is not described here since the receiving system is the same as that shown in FIG. 1.

The receiver 13 comprises the strobe signal receiving circuit 15 and the data receiving circuit 16 as shown in FIG. 7.

The strobe signal receiving circuit 15 comprises a differential amplifier $DA_1$ and a receive termination circuit X. The receive termination circuit X comprises a capacitor $C_0$, a switch element $SW_0$, and resistance elements $R_{00}$ and $R_{01}$. The switch element $SW_0$ is turned on by a control signal $S_0$. When the switch element $SW_0$ is on, the strobe signal receiving circuit 15 is activated and the receiver 13 becomes capable of receiving a signal.

The differential amplifier $DA_1$ is driven by power supply voltages $V_1$ and $V_2$. A drive power of the differential amplifier $DA_1$ is smaller than a drive power of a differential amplifier $DA_2$ as explained in the first embodiment. When the differential amplifier $DA_1$ receives a strobe signal in the preamble period, the differential amplifier $DA_1$ outputs an output signal $S_1$.

The data receiving circuit 16 comprises a differential amplifier $DA_2$, resistance units $REU_1$ and $REU_2$, capacitors (coupling capacitors) $C_1$ and $C_2$, and correction circuits $CC_1$ and $CC_2$. The differential amplifier $DA_2$ comprises a first input terminal and a second input terminal, and outputs an output signal $S_3$ in a data transmission period.

The differential amplifier $DA_2$ is driven by power supply voltages $V_3$ and $V_4$. A drive power of the differential amplifier $DA_2$ is larger than the drive power of the differential amplifier $DA_1$ to realize high-speed data reception. The differential amplifier $DA_2$ is activated after the strobe signal is detected.

The capacitor $C_1$ comprises a first electrode to which a positive phase signal (Lane⁺) is input, and a second electrode connected to a first input terminal of the differential amplifier $DA_2$. The resistance unit $REU_1$ determines a first operation point of the positive phase signal (Lane⁺) in the differential amplifier $DA_2$.

For example, the resistance unit $REU_1$ comprises a resistance element $R_1$ connected between a power supply terminal $V_5$ and the first input terminal of the differential amplifier $DA_2$, and a resistance element $R_2$ connected between a power supply terminal $V_6$ and the first input terminal of the differential amplifier $DA_2$. In this case, the first operation point is determined by a resistance ratio between the resistance elements $R_1$ and $R_2$.

The capacitor $C_2$ comprises a third electrode to which a negative phase signal (Lane⁻) is input, and a fourth electrode connected to the second input terminal of the differential amplifier $DA_2$. The resistance unit $REU_2$ determines a second operation point of the negative phase signal (Lane⁻) in the differential amplifier $DA_2$.

For example, the resistance unit $REU_2$ comprises a resistance element $R_3$ connected between a power supply terminal $V_7$ and the second input terminal of the differential amplifier $DA_2$, and a resistance element $R_4$ connected between a power supply terminal $V_8$ and the second input terminal of the differential amplifier $DA_2$. In this case, the second operation point is determined by a resistance ratio between the resistance elements $R_3$ and $R_4$.

The correction circuit $CC_1$ comprises a resistance element $R_{51}$ connected between a node $N_1$ and the power supply terminal $V_5$, a resistance element $R_{52}$ connected between the node $N_1$ and the power supply terminal $V_6$, and a switch element $SW_1$ connected between the node $N_1$ and the first input terminal of the differential amplifier $DA_2$. The correction circuit $CC_2$ comprises a resistance element $R_{61}$ connected between a node $N_2$ and the power supply terminal $V_7$, a resistance element $R_{62}$ connected between the node $N_2$ and the power supply terminal $V_8$, and a switch element $SW_2$ connected between the node $N_2$ and the second input terminal of the differential amplifier $DA_2$.

The correction circuits $CC_1$ and $CC_2$ are activated by setting the switch elements $SW_1$ and $SW_2$ to be turned on. In other words, the control signal $S6$ makes the switch elements $SW_1$ and $SW_2$ to be turned on in the preamble period. The correction circuits $CC_1$ and $CC_2$ are thereby activated to correct the deviations of the first and second operation points resulting from charging and discharging of the capacitors $C_1$ and $C_2$ in the preamble period. In addition, the control signal $S_6$ makes the switch elements $SW_1$ and $SW_2$ to be turned off in the data transmission period. The data reception can be thereby started in a status in which the first operation point of the positive phase signal and the second operation point of the negative phase signal are not deviated.

In addition, combined impedance of the resistance elements $R_{51}$ and $R_{52}$ in the correction circuit $CC_1$ is lower than combined impedance of the resistance elements $R_1$ and $R_2$ in the resistance unit $REU_1$. In addition, combined impedance of the resistance elements $R_{61}$ and $R_{62}$ in the correction circuit $CC_2$ is lower than combined impedance of the resistance elements $R_3$ and $R_4$ in the resistance unit $REU_2$. Therefore, deviation between the first and second operation points can be corrected and the first and second operation points can be made to rapidly match the operation point of the differential amplifier $DA_2$, in a short preamble period.

An example of the data receiving operation is not explained here since the data receiving operation is the same as that of the first embodiment (FIG. 3).

Thus, in the second embodiment, too, for example, the strobe signal (DC-level signal) supplied during the preamble period under the UHS-II protocol can be detected correctly while setting the first and second operation points within the optimum range of the receiving voltage of the high-speed receiving amplifier. Therefore, for example, packet data can also be received precisely.

In FIG. 7, it is preferable that resistance values of the resistance elements $R_1$ and $R_3$ are substantially equal to each other and resistance values of the resistance elements $R_2$ and $R_4$ are substantially equal to each other. Also, it is preferable that power supply voltages of the power supply terminal $V_5$ and $V_7$ are substantially equal to each other and power supply voltages of the power supply terminal $V_6$ and $V_5$ are substantially equal to each other.

FIG. 8 shows signal waveforms of the receiving signals (differential signals).

The signal waveforms are obtained when the present embodiment is employed.

As clarified from the drawing, deviation occurs between the first and second operation points of the differential signals (i.e., a width between Lane$^+$ and Lane$^-$ becomes smaller) until the correction circuits $CC_1$ and $CC_2$ in FIG. 7 are activated, i.e., until the switch elements $SW_1$ and $SW_2$ are turned on, in the preamble period. By activating the correction circuits $CC_1$ and $CC_2$ in FIG. 7, i.e., turning on the switch elements $SW_1$ and $SW_2$, however, the deviation between the first and second operation points of the differential signals is corrected and the first and second operation points rapidly match the operation point of the differential amplifier $DA_2$.

In addition, since the data (AC-level signal) is transmitted in the data transmission period, the correction circuits $CC_1$ and $CC_2$ are deactivated.

As a result, the first operation point of the positive phase signal (Lane$^+$) in the differential amplifier $DA_2$ in FIG. 7 and the second operation point of the negative phase signal (Lane$^-$) in the differential amplifier $DA_2$ in FIG. 2 substantially match each other, and substantially match the operation point of the differential amplifier $DA_2$, in the data transmission period, too.

The data receiving operation can be therefore performed precisely. For example, since the data can be received precisely from a leading part, the data can be acquired in a short time. In addition, since the overhead time which has been spent at the leading part of the data can be reduced, the data transfer can be performed at a high efficiency.

Thus, according to the second embodiment, the UHS-II protocol can be employed in the AC coupling receiver, by eliminating the influence from the voltage stored in the coupling capacitors in the preamble period, similarly to the first embodiment.

Third Embodiment

FIG. 9 is a block diagram showing a receiving system of a third embodiment.

In the first and second embodiments, the correction circuits which eliminate the influence from the voltage stored in the coupling capacitors has been proposed. In contrast, a correction circuit which prevents the voltage from being stored in the coupling capacitors in a preamble period will be proposed in the third embodiment.

The receiving system of the present embodiment is different from the receiving system shown in FIG. 1 with reference to a feature that a controller 14 comprises a timer T. A role of the timer T will be described later. The other constituent elements are not explained here since they are the same as those shown in FIG. 1.

FIG. 10 shows a receiver of the third embodiment.

A receiver 13 comprises a strobe signal receiving circuit 15 and a data receiving circuit 16.

The strobe signal receiving circuit 15 comprises a differential amplifier $DA_1$ and a receive termination circuit X. The receive termination circuit X comprises a capacitor $C_0$, a switch element $SW_0$, and resistance elements $R_{00}$ and $R_{01}$. The switch element $SW_0$ is turned on by a control signal $S_0$. When the switch element $SW_0$ is on, the strobe signal receiving circuit 15 is activated and the receiver 13 becomes capable of receiving a signal.

The differential amplifier $DA_1$ is driven by power supply voltages $V_1$ and $V_2$. A drive power of the differential amplifier $DA_1$ is smaller than a drive power of a differential amplifier $DA_2$ as explained in the first embodiment. When the differential amplifier $DA_1$ receives a strobe signal in the preamble period, the differential amplifier $DA_1$ outputs an output signal $S_1$.

The data receiving circuit 16 comprises a differential amplifier $DA_2$, resistance units $REU_1$ and $REU_2$, capacitors (coupling capacitors) $C_1$ and $C_2$, and correction circuits CC1 and CC2. The differential amplifier $DA_2$ comprises a first input terminal and a second input terminal, and outputs an output signal $S_3$ in a data transmission period.

The differential amplifier $DA_2$ is driven by power supply voltages $V_3$ and $V_4$. A drive power of the differential amplifier $DA_2$ is larger than the drive power of the differential amplifier $DA_1$ to realize high-speed data reception. The differential amplifier $DA_2$ is activated after the strobe signal is detected.

The capacitor $C_1$ comprises a first electrode to which a positive phase signal (Lane$^+$) is input, and a second electrode connected to a first input terminal of the differential amplifier $DA_2$. The resistance unit $REU_1$ determines a first operation point of the positive phase signal (Lane$^+$) in the differential amplifier $DA_2$.

For example, the resistance unit $REU_1$ comprises a resistance element $R_1$ connected between a power supply terminal $V_5$ and the first input terminal of the differential amplifier $DA_2$, and a resistance element $R_2$ connected between a power supply terminal $V_6$ and the first input terminal of the differential amplifier $DA_2$. In this case, the first operation point is determined by a resistance ratio between the resistance elements $R_1$ and $R_2$.

The capacitor $C_2$ comprises a third electrode to which a negative phase signal (Lane⁻) is input, and a fourth electrode connected to the second input terminal of the differential amplifier $DA_2$. The resistance unit $REU_2$ determines a second operation point of the negative phase signal (Lane⁻) in the differential amplifier $DA_2$.

For example, the resistance unit $REU_2$ comprises a resistance element $R_3$ connected between a power supply terminal V7 and the second input terminal of the differential amplifier $DA_2$, and a resistance element $R_4$ connected between a power supply terminal $V_8$ and the second input terminal of the differential amplifier $DA_2$. In this case, the second operation point is determined by a resistance ratio between the resistance elements $R_3$ and $R_4$.

A correction circuit $CC_1$ comprises a switch terminal T1 connected to the first electrode of the capacitor $C_1$, a switch terminal $T_2$ connected to the first input terminal of the differential amplifier $D_2$ (i.e., the second electrode of the capacitor $C_1$), a 3-terminal switch element $SW_1$ comprising a switch terminal $T_3$, and a resistance element $R_7$ connected between the switch terminal $T_3$ and the first input terminal of the differential amplifier $DA_2$ (i.e., the second electrode of the capacitor $C_1$).

In addition, a correction circuit $CC_2$ comprises a switch terminal $T_4$ connected to the third electrode of the capacitor $C_2$, a switch terminal $T_5$ connected to the second input terminal of the differential amplifier $D_2$ (i.e., the fourth electrode of the capacitor $C_2$), a 3-terminal switch element $SW_2$ comprising a switch terminal $T_6$, and a resistance element $R_8$ connected between the switch terminal $T_6$ and the second input terminal of the differential amplifier $DA_2$ (i.e., the fourth electrode of the capacitor $C_2$).

The correction circuits $CC_1$ and $CC_2$ are activated by setting the switch elements $SW_1$ and $SW_2$ to be turned on, and deactivated by setting the switch elements $SW_1$ and $SW_2$ to be turned off.

Setting the switch elements $SW_1$ and $SW_2$ to be turned on indicates a state in which the switch terminal $T_1$ is connected to the switch terminal $T_2$ or the switch terminal $T_3$ and a state in which the switch terminal $T_4$ is connected to the switch terminal $T_5$ or the switch terminal $T_6$. In addition, setting the switch elements $SW_1$ and $SW_2$ to be turned off indicates a state in which the switch terminal $T_1$ is not connected to the switch terminal $T_2$ or the switch terminal $T_3$ (i.e., an opened state) and a state in which the switch terminal $T_4$ is not connected to the switch terminal $T_5$ or the switch terminal $T_6$ (an opened state).

In other words, the correction circuits $CC_1$ and $CC_2$ can be in one of the following three state, in the present embodiment.

Short (Bypass) State

The short state indicates a state in which the switch terminal $T_1$ is connected to the switch terminal $T_2$ and the switch terminal $T_4$ is connected to the switch terminal $T_5$. In other words, the short state indicates a state in which the first and second electrodes of the capacitor (coupling capacitor) $C_1$ are shorted, the third and fourth electrodes of the capacitor (coupling capacitor) $C_2$ are shorted and, consequently, two coupling capacitors do not substantially exist.

Loaded State

The loaded state indicates a state in which the switch terminal $T_1$ is connected to the switch terminal $T_3$ and the switch terminal $T_4$ is connected to the switch terminal $T_6$. In other words, the loaded state indicates a state in which the capacitors (coupling capacitors) $C_1$ and $C_2$ are connected in parallel with the resistance elements $R_7$ and $R_8$ respectively.

Opened State

The opened state indicates a state in which the switch terminal $T_1$ is not connected to the switch terminal $T_2$ or $T_3$ and the switch terminal $T_4$ is not connected to the switch terminal $T_5$ or $T_6$. In other words, two capacitors (coupling capacitors) $C_1$ and $C_2$ function effectively.

The controller 14 in FIG. 9 controls the three states by using the control signal $S_6$, in the preamble period and the data transmission period.

For example, the controller 14 makes the state of the switch elements $SW_1$ and $SW_2$ from the opened state to the short state in the preamble period. Since the voltage is not thereby stored in the capacitors (coupling capacitors) $C_1$ and $C_2$, deviations of the first and second operation points of the differential signal do not occur in the preamble period. After that, the controller 14 makes the state of the switch elements $SW_1$ and $SW_2$ from the short state to the loaded state in the preamble period.

The controller 14 manages a period (i.e., a period of the short state) from the time when the state is made from the opened state to the short state, to the time when the state is made from short state to the loaded state, by, for example, the timer T in FIG. 9. This period is shorter than the preamble period.

After that, when the controller 14 confirms that the preamble period is changed to the data transmission period, the controller 14 makes the state of the switch elements $SW_1$ and $SW_2$ from the loaded state to the opened state. The capacitors (coupling capacitors) C1 and C2 can thereby function effectively and start the data receiving operation in a status in which the deviation does not occur between the first and second operation points of the differential signal.

If the switch elements $SW_1$ and $SW_2$ are made to directly from the shorted state to the opened state, the coupling capacitors may be suddenly arisen and a disturbance of the differential signal may occur in the data receiving operation.

For this reason, the switch elements $SW_1$ and $SW_2$ are made at three steps of the shorted state, the loaded state and the opened state in order, in the present embodiment. The disturbance of the differential signal hardly occurs in the data receiving operation by setting the loaded state between the shorted state and the opened state in this manner.

In FIG. 10, it is preferable that resistance values of the resistance elements $R_1$ and $R_3$ are substantially equal to each other and resistance values of the resistance elements $R_2$ and $R_4$ are substantially equal to each other. Also, it is preferable that power supply voltages of the power supply terminal $V_5$ and $V_7$ are substantially equal to each other and power supply voltages of the power supply terminal $V_6$ and $V_8$ are substantially equal to each other.

FIG. 11 shows an example of the data receiving operation.

The data receiving operation is controlled by the controller 14 in FIG. 9. In the following descriptions, reference numerals attached to the respective constituent elements correspond to the reference numerals shown in FIG. 9 and FIG. 10.

First, when the data receiving operation is performed, the controller 14 activates the strobe signal receiving circuit 15, deactivates the data receiving circuit 16, and sets the switch elements $SW_1$ and $SW_2$ to the opened state, as initial setting (step $ST_{11}$).

Next, when the controller 14 detects the strobe signal, the controller 14 activates the data receiving circuit (steps $ST_{12}$ to $ST_{13}$). In addition, the controller 14 makes the state of the switch elements $SW_1$ and $SW_2$ from the opened state to the short state (step $ST_{141}$). The timing of forcing the switches $SW_1$ and $SW_2$ to the shorted state may be the same as or different from the timing of activating the data receiving circuit.

Next, after a period predetermined by the timer T in FIG. 9 has passed from the time when the switch elements $SW_1$ and $SW_2$ are made to the shorted state, the controller 14 makes the switch elements $SW_1$ and $SW_2$ from the shorted state to the loaded state (step $ST_{142}$).

The predetermined is set to be a time enough for the voltage of the first and second electrodes of the capacitor (coupling capacitor) $C_1$ and the voltage of the third and fourth electrodes of the capacitor (coupling capacitor) $C_2$ to be stable, in the shorted state or a time longer than this time.

In addition, the following measures will be taken to minimize the influence of the voltage stored in the capacitors (coupling capacitors) $C_1$ and $C_2$ in the loaded state.

The resistance values of the resistance elements $R_7$ and $R_8$, and the capacitances of the capacitors $C_1$ and $C_2$ are adjusted so as to prevent as much voltage from being stored as possible in the capacitors (coupling capacitors) $C_1$ and $C_2$ and to make the time constant of the resistance elements R7 and R8 and the capacitors (coupling capacitors) $C_1$ and $C_2$ to be as large as possible, in the period from the start of loaded state to the end of load state (start of the opened state).

Thus, the disturbance of the differential signal can be prevented as an effect of setting the loaded state, and occurrence of the deviation between the first and second operation points of the differential signal as a side effect of setting the loaded state can be suppressed.

Next, when the controller 14 detects the data, the controller 14 makes the state of the switches $SW_1$ and $SW_2$ from the loaded state to the opened state (steps $ST_{15}$ to $ST_{161}$), and starts receiving, for example, packet data by using the data receiving circuit 16 (step $ST_{17}$).

Thus, in the third embodiment, for example, the strobe signal (DC-level signal) supplied during the preamble period under the UHS-II protocol can be detected correctly while setting the first and second operation points within the optimum range of the receiving voltage of the high-speed receiving amplifier. Therefore, for example, packet data can also be received precisely.

(Memory Card System)

A high-speed transmission system based on differential serial coupling is generally adopted in an interface which makes connection between a processor and a peripheral device, in accordance with acceleration of the peripheral device. This system is adopted by standards such as USB, PCIe and SATA.

The system of an interface of a memory card system is also being changed from a conventional system (UHS-I) to a differential serial transmission (UHS-II) suitable to the high-speed data transmission. However, the memory card has a characteristic that physical contact status between an electrode of the memory card and an electrode of a socket becomes easily unstable since the memory card is removable.

Therefore, handshake under the protocol is performed by not the high frequency signal, but the DC-level signal, in the memory card system. In contrast, AC coupling capable of largely keeping the degree of freedom is desirably adopted to improve the receiver's performance in the high-speed transmission. In other words, the DC-level signal is used for handshake between the transmitter and the receiver, and the AC coupling is adopted for the data receiving operation, in the memory card system.

Thus, applying the receiving system of the first to third embodiments to the memory card is very effective.

Figure 12:
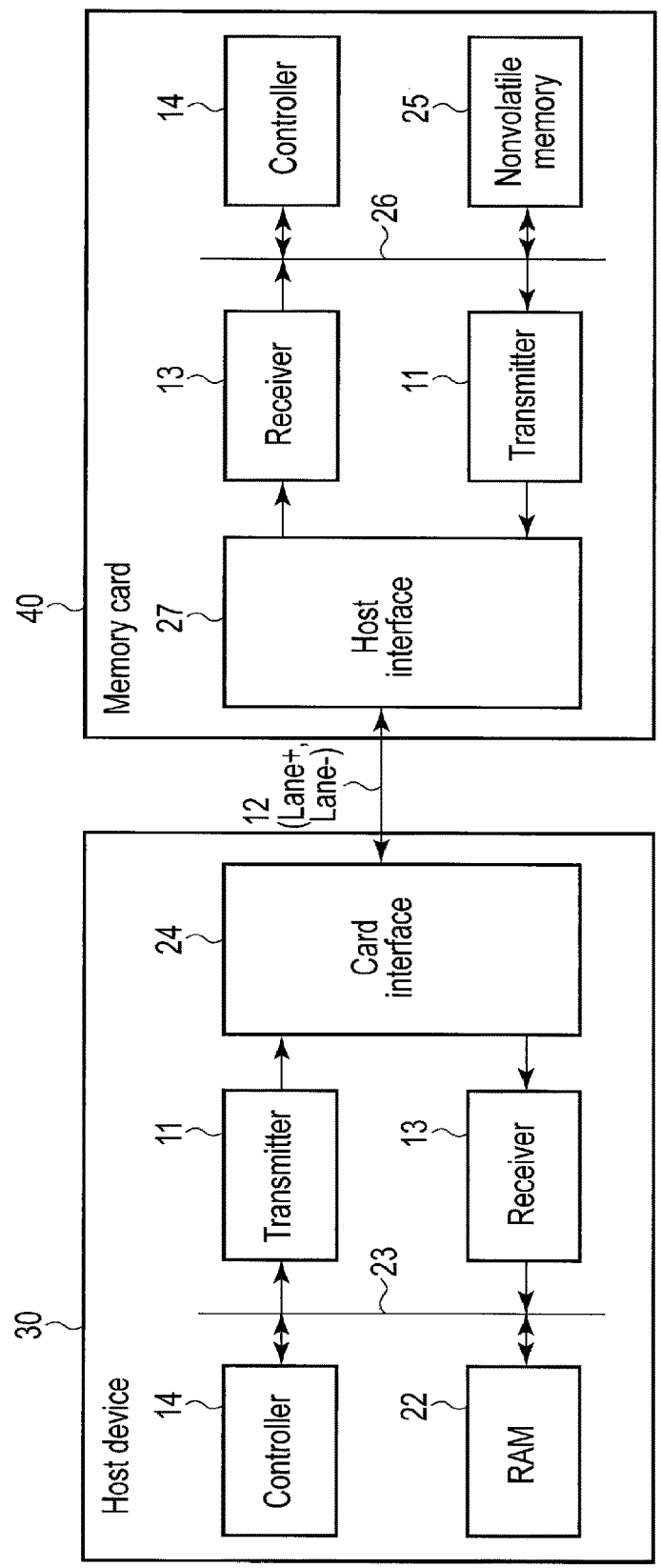
FIG. 12 is a block diagram showing an example of a memory card system as an application example.

FIG. 12 shows a memory card system as an example of application.

A host device 30 and a memory card 40 are connected to each other via a transmission path (Lane$^+$ and Lane$^-$) 12. The host device 30 is an electronic device such as a personal computer, a digital camera, a smartphone, and a tablet computer.

The host device 30 comprises a transmitter 11, a receiver 13, a controller 14, a random access memory (RAM) 22, a bus 23, and a card interface 24. Explanations of the transmitter 11, the receiver 13, and the controller 14 are omitted here since they correspond to the transmitter 11, the receiver 13, and the controller 14 of the first to third embodiments. If the host device 30 comprises a data transmitting function alone, the receiver 13 in the host device 30 can be omitted.

The memory card 40 comprises a transmitter 11, a receiver 13, a controller 14, a nonvolatile memory 25, a bus 26, and a host interface 27. Explanations of the transmitter 11, the receiver 13, and the controller 14 are omitted here since they correspond to the transmitter 11, the receiver 13, and the controller 14 of the first to third embodiments. The nonvolatile memory 25 is, for example, a NAND flash memory.

CONCLUSION

Thus, according to the embodiments, even if UHS-II protocol is employed, the operation points of the differential signal is not deviated at data reception, by employing the receiving system capable of eliminating the influence from the voltage stored in the coupling capacitors or preventing the voltage from being stored in the coupling capacitors, in the preamble period. A precise receiving operation can be therefore performed in the AC coupling receiver employing UHS-II protocol.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A receiving system comprising:
   a first receiving circuit and a second receiving circuit each receiving a differential signal with a positive phase signal and a negative phase signal; and
   a controller controlling the first and second receiving circuits,
   the first receiving circuit comprises a first differential amplifier outputting a first signal in a first time frame in which a polarity of the differential signal does not change dependent on a passage of time,
   the second receiving circuit comprises a second differential amplifier having a first input terminal and a second input terminal and outputting a second signal in a second time frame in which the polarity of the differential signal changes dependent on the passage of time,
   a first capacitor having a first electrode inputted the positive phase signal and a second electrode connected to the first input terminal, a first resistance unit determining a first operation point of the positive phase signal in the second differential amplifier, a second capacitor having a third electrode inputted the negative phase signal and a fourth electrode connected to the second input terminal, a second resistance unit determining a second operation point of the negative phase signal in the second differential amplifier, and a correction circuit correcting a deviation between the first and second operation points, and the controller activates the second differential amplifier and the correction circuit on the basis of the first signal, and deactivates the correction circuit on the basis of the second signal.

2. The receiving system of claim 1, wherein
the first resistance unit comprises:
a first resistance element connected between a first power supply terminal and the first input terminal; and
a second resistance element connected between a second power supply terminal and the first input terminal and
the second resistance unit comprises:
a third resistance element connected between a third power supply terminal and the second input terminal; and
a fourth resistance element connected between a fourth power supply terminal and the second input terminal.

3. The receiving system of claim 2, wherein
the correction circuit comprises:
a fifth resistance element and a first switch element connected in series between the first input terminal and the second power supply terminal; and
a sixth resistance element and a second switch element connected in series between the second input terminal and the third power supply terminal, and
the controller activates the correction circuit by turning on the first and second switch elements.

4. The receiving system of claim 2, wherein
the correction circuit comprises:
a fifth resistance element connected between a first node and the first power supply terminal;
a sixth resistance element connected between the first node and the second power supply terminal;
a first switch element connected between the first node and the first input terminal;
a seventh resistance element connected between a second node and the third power supply terminal;
an eighth resistance element connected between the second node and the fourth power supply terminal; and
a second switch element connected between the second node and the second input terminal, and
the controller activates the correction circuit by turning on the first and second switch elements.

5. The receiving system of claim 2, wherein
the correction circuit comprises:
a first switch element comprising a first switch terminal connected to the first electrode, a second switch terminal connected to the first input terminal, and a third switch terminal; and
a second switch element comprising a fourth switch terminal connected to the third electrode, a fifth switch terminal connected to the second input terminal, and a sixth switch terminal, and
the controller activates the correction circuit by connecting the first switch terminal to the second or third switch terminal and connecting the fourth switch terminal to the fifth or sixth switch terminal.

6. The receiving system of claim 5, wherein
the controller connects the first switch terminal to the third switch terminal after connecting the first switch terminal to the second switch terminal, in a first period, and connects the fourth switch terminal to the sixth switch terminal after connecting the fourth switch terminal to the fifth switch terminal, in the first period.

7. The receiving system of claim 6, wherein
the controller comprises a timer which determines a period from a time when the first switch terminal is connected to the second switch terminal to a time when the first switch terminal is connected to the third switch terminal, and a period from a time when the fourth switch terminal is connected to the fifth switch terminal to a time when the fourth switch terminal is connected to the sixth switch terminal.

8. The receiving system of claim 1, wherein
the first and second operation points substantially match in first and second periods.

9. The receiving system of claim 1, wherein
a drive power of the first differential amplifier is smaller than a drive power of the second differential amplifier.

10. The receiving system of claim 1, wherein
the controller outputs a control signal to activate the first receiving circuit.

11. A memory card comprising:
a nonvolatile memory;
a first receiving circuit and a second receiving circuit each receiving a differential signal with a positive phase signal and a negative phase signal; and
a controller controlling the nonvolatile memory and the first and second receiving circuits,
the first receiving circuit comprises a first differential amplifier outputting a first signal in a first time frame in which a polarity of the differential signal does not change dependent on a passage of time,
the second receiving circuit comprises a second differential amplifier having a first input terminal and a second input terminal and outputting a second signal in a second time frame in which the polarity of the differential signal changes dependent on the passage of time,
a first capacitor having a first electrode inputted the positive phase signal and a second electrode connected to the first input terminal, a first resistance unit determining a first operation point of the positive phase signal in the second differential amplifier, a second capacitor having a third electrode inputted the negative phase signal and a fourth electrode connected to the second input terminal, a second resistance unit determining a second operation point of the negative phase signal in the second differential amplifier, and a correction circuit correcting a deviation between the first and second operation points, and
the controller activates the second differential amplifier and the correction circuit on the basis of the first signal, and deactivates the correction circuit on the basis of the second signal and writes the second signal in the nonvolatile memory.

12. The memory card of claim 11, wherein
the first resistance unit comprises:
a first resistance element connected between a first power supply terminal and the first input terminal; and
a second resistance element connected between a second power supply terminal and the first input terminal, and
the second resistance unit comprises:
a third resistance element connected between a third power supply terminal and the second input terminal; and a fourth resistance element connected between a fourth power supply terminal and the second input terminal.

13. The memory card of claim 12, wherein the correction circuit comprises:
a fifth resistance element and a first switch element connected in series between the first input terminal and the second power supply terminal; and
a sixth resistance element and a second switch element connected in series between the second input terminal and the third power supply terminal, and
the controller activates the correction circuit by turning on the first and second switch elements.

14. The memory card of claim 12, wherein the correction circuit comprises:
a fifth resistance element connected between a first node and the first power supply terminal;
a sixth resistance element connected between the first node and the second power supply terminal;
a first switch element connected between the first node and the first input terminal;
a seventh resistance element connected between a second node and the third power supply terminal;
an eighth resistance element connected between the second node and the fourth power supply terminal; and
a second switch element connected between the second node and the second input terminal, and
the controller activates the correction circuit by turning on the first and second switch elements.

15. The memory card of claim 12, wherein the correction circuit comprises:
a first switch element comprising a first switch terminal connected to the first electrode, a second switch terminal connected to the first input terminal, and a third switch terminal; and
a second switch element comprising a fourth switch terminal connected to the third electrode, a fifth switch terminal connected to the second input terminal, and a sixth switch terminal, and
the controller activates the correction circuit by connecting the first switch terminal to the second or third switch terminal and connecting the fourth switch terminal to the fifth or sixth switch terminal.

16. The memory card of claim 15, wherein the controller connects the first switch terminal to the third switch terminal after connecting the first switch terminal to the second switch terminal, in a first period, and connects the fourth switch terminal to the sixth switch terminal after connecting the fourth switch terminal to the fifth switch terminal, in the first period.

17. The memory card of claim 16, wherein the controller comprises a timer which determines a period from a time when the first switch terminal is connected to the second switch terminal to a time when the first switch terminal is connected to the third switch terminal, and a period from a time when the fourth switch terminal is connected to the fifth switch terminal to a time when the fourth switch terminal is connected to the sixth switch terminal.

18. The memory card of claim 11, wherein the first and second operation points substantially match in first and second periods.

19. The memory card of claim 11, wherein a drive power of the first differential amplifier is smaller than a drive power of the second differential amplifier.

20. The memory card of claim 11, further comprising:
a transmitting circuit transmitting a third signal from the nonvolatile memory as the differential signal, wherein
the controller deactivates the transmitting circuit when the controller activates the first receiving circuit.

* * * * *